United States Patent [19]

Cooper

[11] Patent Number: 4,465,595
[45] Date of Patent: Aug. 14, 1984

[54] APPARATUS FOR ASSEMBLY AND DISSASSEMBLY OF A FILTER CONSTRUCTION

[75] Inventor: Roydon B. Cooper, Lattingtown, N.Y.

[73] Assignee: Pall Corporation, Glen Cove, N.Y.

[21] Appl. No.: 522,991

[22] Filed: Aug. 15, 1983

[51] Int. Cl.³ .............................................. B01D 27/08
[52] U.S. Cl. ................................. 210/238; 210/443; 210/541; 210/DIG. 17
[58] Field of Search ................. 210/90, 130, 133, 136, 210/232–238, 435, 437, 439, 440, 441, 443, 444, 446, 448, 450, 541, DIG. 17; 220/284, 285, 286; 285/39, 356

[56] References Cited

U.S. PATENT DOCUMENTS

| | | | |
|---|---|---|---|
| 1,328,853 | 1/1920 | Steward | 210/439 X |
| 4,172,798 | 10/1979 | Kronsbein | 210/450 X |
| 4,316,801 | 2/1982 | Cooper | 210/133 X |
| 4,395,060 | 7/1983 | Lapham | 285/356 X |

*Primary Examiner*—John Adee
*Assistant Examiner*—W. Gary Jones
*Attorney, Agent, or Firm*—Leydig, Voit, Osann, Mayer & Holt, Ltd.

[57] ABSTRACT

In accordance with the present invention, there is provided a filter assembly having an improved system for selectively jacking a filter canister into and out of engagement with a filter head. A threaded jackscrew is mated to a threaded portion of the filter head and rotatably mounted to the filter canister, but longitudinally confined near the canister top. The assembly accommodates a second class lever whose fulcrum end is received in a recess in the filter head. The jackscrew includes a plurality of circumferentially spaced lugs around the jackscrew perimeter against which the central portion of the lever can successively act. The manual application of force to the free end of the lever creates a mechanical advantage at the jackscrew lugs such that a torque sufficient to free and turn the jackscrew can be generated. Repeated pivoting of the lever against the lugs of the jackscrew in a ratchet-like manner unscrews the jackscrew, and the captive canister, from the filter head.

7 Claims, 3 Drawing Figures

APPARATUS FOR ASSEMBLY AND DISSASSEMBLY OF A FILTER CONSTRUCTION

FIELD OF THE INVENTION

The invention relates in general to filter assemblies and more particularly to filter assemblies which require periodic removal of a canister to service the filter element.

BACKGROUND OF THE INVENTION

In many filter constructions, assemblies are provided which include a removable canister which houses the filter element. Often in industrial filtering applications, pressure within the filter can reach 2,000 p.s.i., or more. To protect against leakage at the area joining the canister to the filter body or head, the canister must be tightly and securely held to the filter head. A common solution to the problem of providing a tight and secure assembly which prevents leakage is to provide compression seals or other gasket-type sealing members between the canister and the filter head.

For proper operation of the filter, it is necessary that a schedule for periodic maintenance be followed. To maintain the integrity of the seals through multiple disassemblies for the purpose of replacing the filter element, different coupling mechanisms between the filter head and canister have been suggested. One such coupling is shown in my U.S. Pat. No. 4,316,801 which discloses a jackscrew connection between the filter head and canister. Wear of the seal between the filter head and canister is minimized since the canister does not rotate relative to the filter head as it is removed or replaced. Instead, the canister is jacked on and off the filter head by the jackscrew which is rotatably mounted on the canister.

Unfortunately, even with the arrangement disclosed in my earlier patent, many combined factors can contribute to a condition in which the canister is difficult to remove from the filter head. One factor is the tight engagement between the canister and filter head which is required to prevent leaks at high pressure operation. Also, the filter is often exposed to environmental conditions resulting in corrosive build-up at the mating joint of the canister and filter head. High internal fluid pressure is another factor which may contribute to difficult canister removal by causing expansion of the sealing members which results in an even tighter engagement between the filter head and the canister. Finally, in some applications, the filter may be exposed to thermal cycling which expands and contracts filter parts into an even tighter engagement than originally achieved.

Because of this difficulty, periodic maintenance has sometimes been ignored. As a result, the filter becomes too clogged to pass fluid, which causes a safety pressure relief valve to open and allow the fluid to bypass the filter element. While the fluid system continues to function, the fluid no longer is cleaned of the contaminants. As a consequence, the useful life of the fluid system is shortened and the system integrity compromised.

In an attempt to free up a seemingly frozen connection between the canister and the filter element, ad hoc procedures have been used such as vibrating the joining area between the filter head and canister by firmly tapping the filter assembly. Repeated use of such a procedure can damage the structural integrity of the filter assembly. In addition, special tools, such as strap wrenches, are typically required to tighten or loosen a filter canister, or a jackscrew such as is disclosed in my earlier patent. The difficulty and need for special tools to loosen the canister creates a condition which discourages periodic disassembly of the filter for replacement of the filter element.

SUMMARY OF THE INVENTION

It is a primary object of the invention to provide an apparatus and method for loosening the canister from a filter assembly with sufficient ease and convenience so as not to discourage the periodic replacement of the filter element. In this connection, a related object of the invention is to provide such a filter assembly which loosens easily wherein no special tools are required.

It is a further and related object of the invention to provide a filter assembly which can be re-assembled and properly tightened easily and without the use of special tools.

It is another object of the invention to provide a mated connection between the canister and filter head which is sufficiently tightly sealed yet does not require hammer tapping or other destructive shock methods to initiate the loosening of the mated connection.

Yet another object of the invention is to provide such an improved filter assembly which achieves the foregoing objectives and which is relatively inexpensive to manufacture.

Other objects and advantages of the invention will be apparent from the following detailed description and the accompanying drawings.

In accordance with the present invention, there is provided a filter assembly having an improved system for loosening an annular threaded jackscrew mated to a threaded circular opening in the lower portion of a filter head and rotatably mounted to a filter canister. The assembly incorporates provision for a second class lever whose fulcrum is received in a recess in the filter head. The jackscrew includes a plurality of circumferentially spaced lugs around the jackscrew perimeter against which the central portion of the lever can successively act. The manual application of force to the free end of the lever creates a mechanical advantage at the jackscrew lugs such that a torque sufficent to free and turn the jackscrew can be generated. Repeated pivoting of the lever against the lugs of the jackscrew in a ratchet-like manner unscrews the jackscrew, and the captive canister, from the filter head.

While the invention will be described in connection with certain preferred embodiments, it will be understood that it is not intended to limit the invention to those particular embodiments. On the contrary, it is intended to cover all alternatives, modifications and equivalents as may be included within the spirit and scope of the invention defined by the appended claims.

DESCRIPTION OF THE PREFERRED EMBODIMENT

Figure 1:
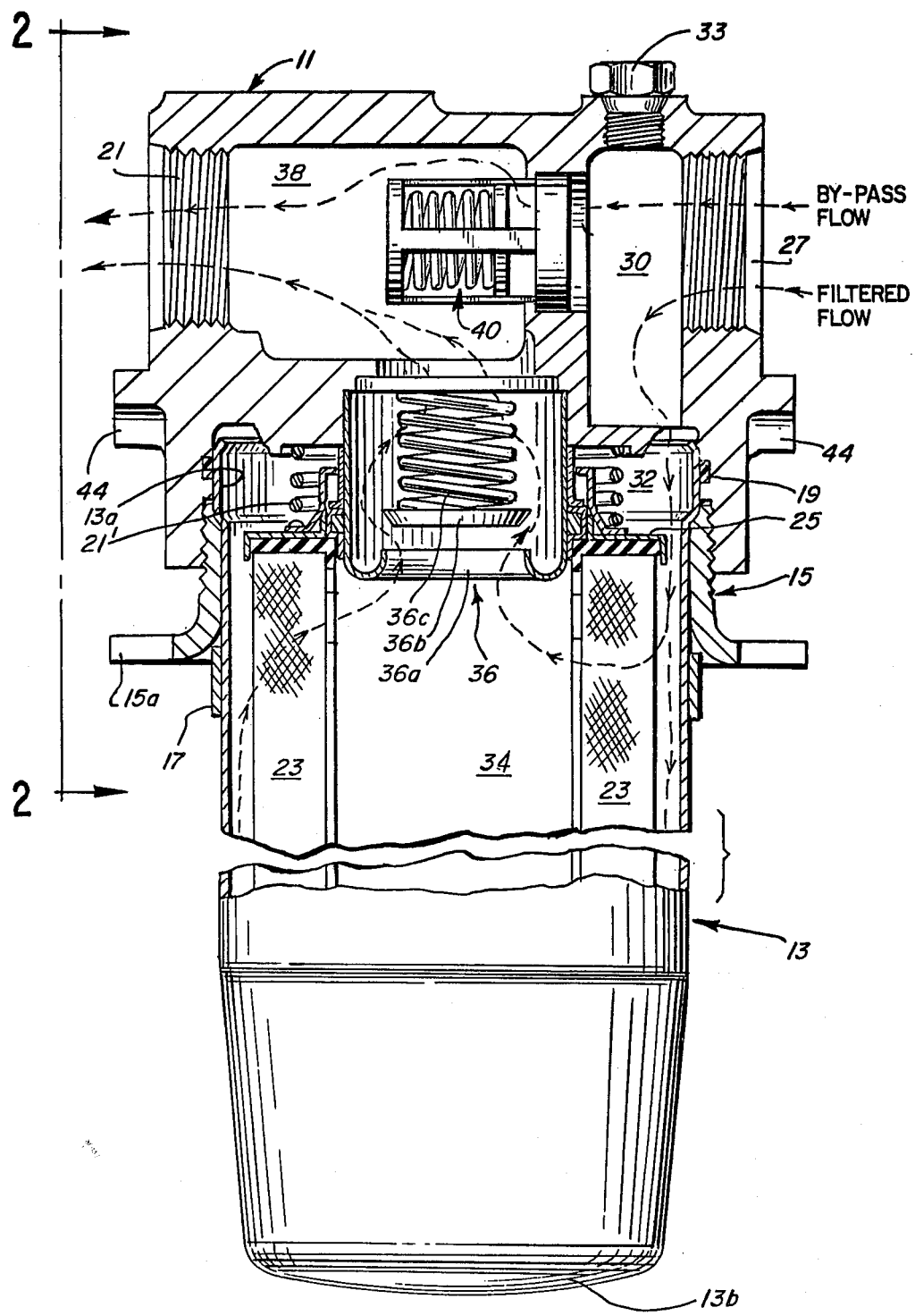
FIG. 1 is a partial cross-sectional view of a filter assembly embodying the present invention.

Turning now to the drawings, and referring first to FIG. 1, there is illustrated a filter assembly comprising a filter head 11, a filter canister 13 and a jackscrew 15 according to the present invention for coupling the canister and filter head into tight engagement. In order to allow the canister 13 to be jacked into engagement with the filter head 11, the jackscrew 15 is mounted on the outer surface of the canister 13 and is free to rotate about the canister, but not free to move longitudinally. The jackscrew 15 is generally annular in shape with an inside diameter large enough to permit free rotation about the cylindrical canister 13 and with a flared edge 15a which forms an outwardly radial projection. In order for the jackscrew 15 to mate with the filter head 11, its outer annular surface is threaded. The external thread of the jackscrew 15 mates with an internal thread in a cavity in the lower portion of the filter head 11. Alternatively, though not preferred, the jackscrew 15 could be provided with the internal threads, and the filter head 11 with the external threads, similar to the arrangement in my above-identified patent.

To prevent movement of the jackscrew 15 along the longitudinal axis of the canister 13, an annular retainer ring 17 is secured, by welding or another suitable method, to the canister just under the flared edge 15a of the jackscrew. The annular retainer ring 17 also provides a surface against which the jackscrew 15 can bear to exert a downward force on the canister. A ridge 13a at the top of the canister housing above the jackscrew 15 creates a diameter greater than the inside diameter of the jackscrew against which the jackscrew can bear to exert an upward force on the canister. Accordingly, the jackscrew 15 is not only free to rotate about the canister 13 in a manner similar to a wheel rotating about its axle, but is adjacent to upper and lower bearing surfaces to effect the jacking action, described below.

When first engaging the canister 13 into the filter head 11, the canister ridge 13a serve to pilot the threads of the jackscrew 15 into correct engagement with the threads of the filter head 11, thus simplifying assembly and reducing the chance of cross-threading, especially in the case of large filter assemblies. Once the two threaded portions are mated, the jackscew 15 is screwed into the filter head 11 to jack the canister 13 into tight engagement with the filter head. To compliment the tight engagement and to ensure the prevention of leakage, a gasket 19 is provided in the side wall of the filter head circular cavity receiving the canister 13 and jackscrew 15. Since the canister 13 is not rotated as it is mated with the filter head 11, the gasket 19 provides a good, durable seal which can withstand multiple servicings of the filter.

In order to stabilize the filter element 23 during operation and to automatically free it as the jackscrew 15 jacks the canister away from the filter head 11, a coil spring 21' is provided between the filter head and the filter element 23 to force the latter against the bottom portion 13b of the canister. Cooperating with the coil spring 21' is an annular platform 25 which mates with the top of the filter element 23 and compresses the coil spring 21' as the canister 13 and filter element are jacked into the filter head.

In operation, fluid to be filtered passes through an inlet port 27 into an inlet flow passageway 30 and into the canister interior 32. When the filter element 23 is being replaced or when other areas of the fluid system are being serviced, a plug 33 can be removed which exposes the passageway 30 for the purpose of adding fluid or allowing air to escape. The fluid passes through the filter element 23 and into the central region 34. In the process of passing through the filter element 23, contaminants are deposited in the element, leaving the fluid exiting the element into the central region 34 in a cleaner condition.

From the central region 34 the fluid flows up through an anti-drain poppet valve 36 comprising a valve seat 36a, valve 36b and compression spring 36c. Fluid pressure maintains the poppet valve 36 in an open position during operation. When the filter is serviced, back pressure closes the valve and prevents loss of fluid from the outlet port 21. From the anti-drain poppet valve 36 the fluid enters outlet flow passageway 38 and exits the filter through outlet port 21.

When the differential pressure across the filter element due to clogging with contaminants exceeds a certain predetermined minimum, a spring biased by-pass valve 40 connecting the inlet flow passageway 30 with the outlet flow passageway 38 will open to allow fluid to flow through the filter assembly without passing through the filter element. This by-pass valve 40 provides a safety feature which prevents hazardous pressure build-up. Unfortunately, it also reduces the incentive to remove the canister 13 to replace the filter element 23 since the fluid continues to flow normally even after the filter element clogs. This lack of immediate serious consequences of filter clogging, when coupled with the difficulty and inconvenience in removing canisters in prior art designs, often resulted in a failure to periodically replace the filter element.

Figure 2:
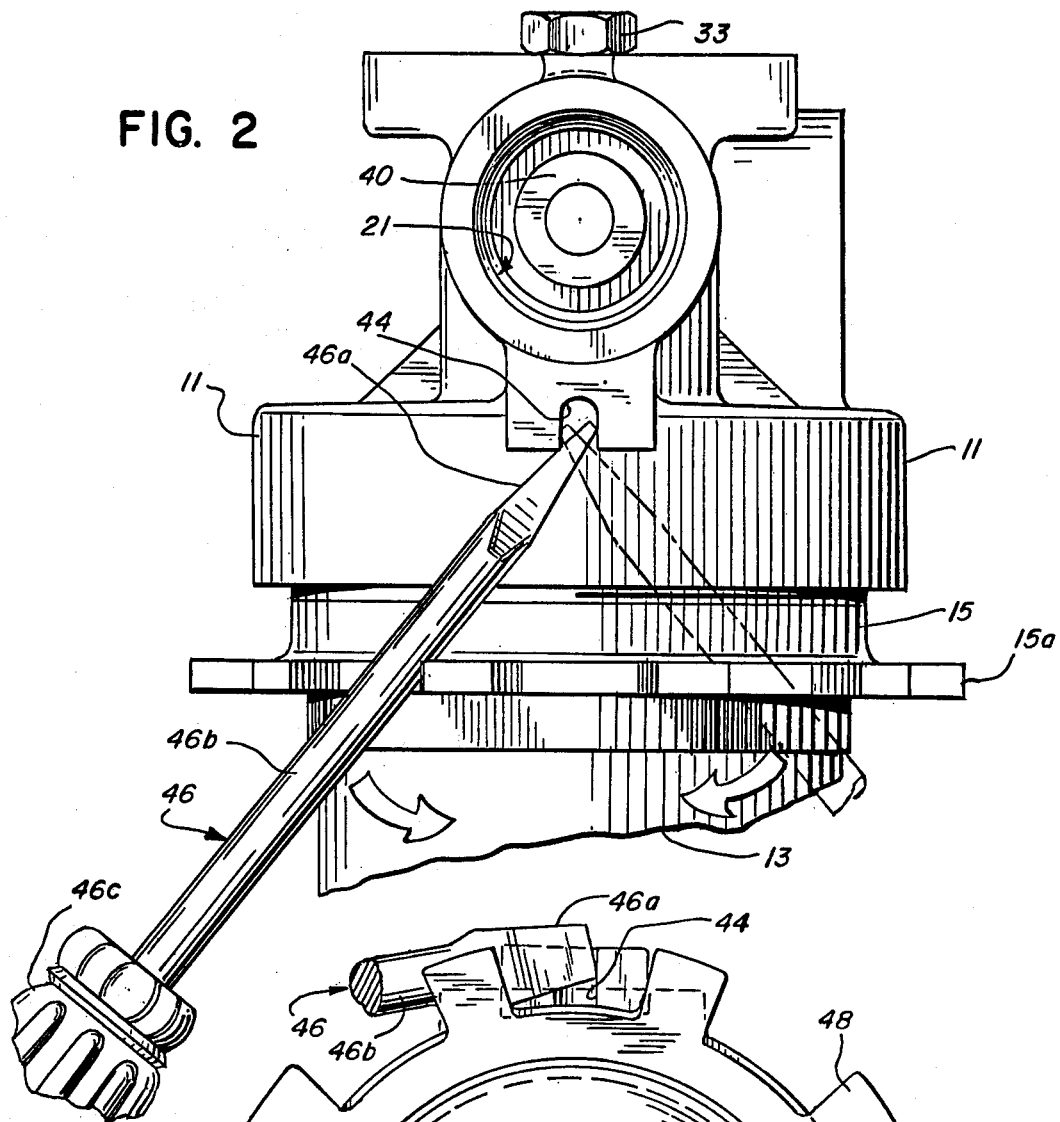
FIG. 2 is a side view of the filter embodying the present invention taken generally along the line 2—2 in FIG. 1.

In accordance with an important aspect of the invention, a notch 44 integral with the filter head 11 cooperates with the flared area 15a of the jackscrew 15 to create a second class lever fulcrum and bearing point arrangement as illustrated in FIG. 2 wherein a screwdriver is shown as the lever itself. The notch 44 may be machined or cast into the filter head 11, or may be formed in a block bolted or otherwise securely fastened to the filter head. The latter approach might be employed in retrofit applications. The second class lever utilizes its inherent mechanical advantage to create a powerful torque on the jackscrew 15 for the purpose of tightening or loosening the connection between the filter head 11 and the canister 13. The ability to use a screwdriver as a lever eliminates the requirement of a special tool to remove the filter canister, as in prior art designs. Often with such prior art designs, even if the special tool was available, the canister was so tightly secured or frozen by corrosion and/or rust that removal of the canister required a ritual of alternately tugging, yanking and vibration-tapping the casing in an effort to free the frozen seal between the canister and filter head. With the present invention, however, by employing a lever and its associated mechanical advantages, a canister which otherwise might have proven difficult to remove can be loosened without difficulty or frustration. The common, and almost always available screwdriver, is well suited for use as the lever.

Figure 3:
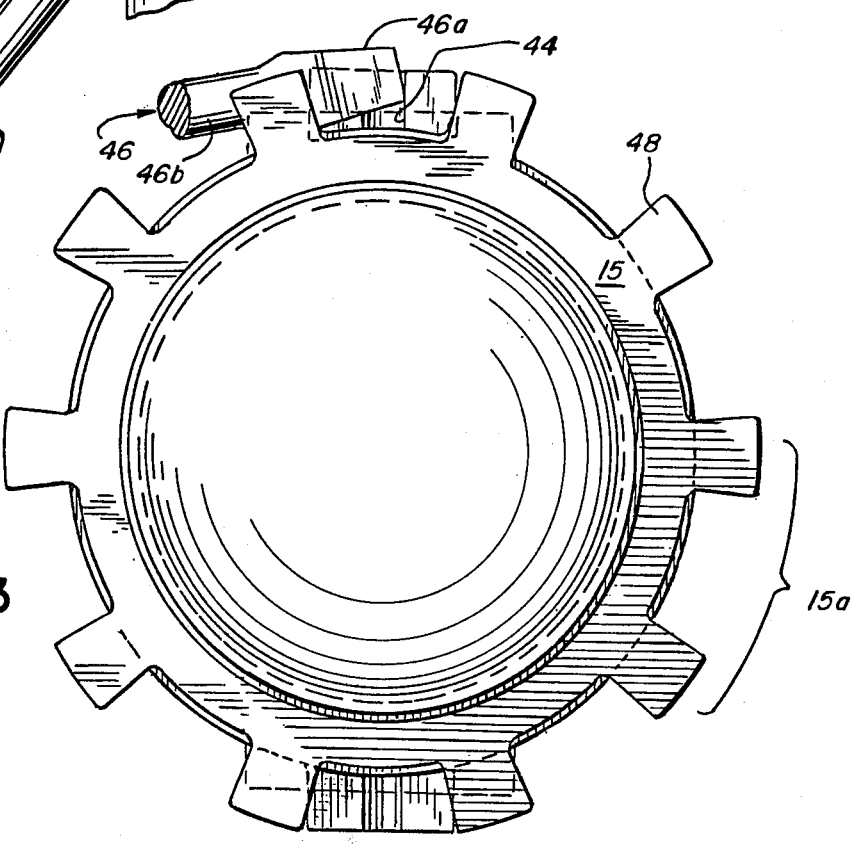
FIG. 3 is a plan view of the jackscrew embodying the present invention.

Referring to FIGS. 2 and 3, the notch 44 provides a recessed area in the filter head 11 which receives the tip or blade portion 46a of a screwdriver 46 to provide a fulcrum for the lever. The point of resistance for the lever is provided between the screwdriver shaft 46b and the lugs 48 in the flared area 15a of jackscrew 15. When tightening the jackscrew 15, the lever force is applied at the screwdriver handle 46c in a ratchet-like motion from left to right in FIG. 2. Conversely, the screwdriver 46 shown in phantom-line in FIG. 2, when moved right to left in a ratchet-like motion, loosens the jackscrew 15 from its seated position in the filter head 11.

It will be appreciated that although a screwdriver is particularly convenient for providing the operative portion of the lever, any other appropriate device can be substituted. For example, a simple steel rod of sufficient length and strength could be used, provided its end could be received by the recess of notch 44.

As illustrated by FIG. 2, the lever (e.g., a screwdriver) is moved through an arc centered about the notch 44. The torque applied to the jackscrew 15 is at its minimum at the two end points of the lever's journey. The torque is maximized when the lever occupies a vertical position as shown in FIG. 2, or, more generally, occupies an axial position parallel to the jackscrew's axis of rotation. If the lever engages a notch 48 which is at too great an angle from a vertical lever position, the torque will be too small to be effective in loosening or tightening the jackscrew 15. Moreover, if the lever angle from vertical is too great, the threaded connection between the jackscrew 15 and filter head 11 could be damaged as a result of the downward force component.

Accordingly, the lugs 48, shown in FIG. 3, should not be too few in number and, consequently, spaced too far apart. They should instead be spaced close enough around the perimeter of the jackscrew 15 so as to ensure one of the lugs 48 is within the arc of the lever motion whose outer boundaries result in enough transferred torque so as to effectively turn the jackscrew 15. Of course, spacing between the lugs 48 must be sufficiently wide to accommodate the lever throughout its full swing. Finally, the jackscrew and the lugs thereon must obviously be of sufficient strength generally to withstand the mechanical stress of the lever action.

By using an external thread on the jackscrew as illustrated, and thereby minimizing its diameter, even jackscrews for large filter canisters are susceptible to fabrication through stamping instead of the more expensive casting process which might be required using the arrangement of my earlier patent. It should also be noted that the arrangement of the filter head 11, canister 13 and jackscrew 15 shown in FIG. 1 allows for economical manufacturing processes throughout. For example, the canister 13 has no critical inside diameters. In contrast, many prior art filter assemblies, including that in my patent referred to above, have critical inside diameters, which are more difficult to achieve.

From the foregoing, it will be appreciated that the filter assembly according to the invention utilizes a lever mechanism to create a powerful torque on the jackscrew so as to aid in the tightening and loosening of the canister and filter head connection. The lever mechanism can be provided by an ordinary screwdriver which allows the filter element to be replaced without difficulty and without special tools. As a result of the easier servicing of the filter, periodic maintenance is more likely to be carried out.

I claim:

1. An apparatus for selectively jacking a filter canister into and out of engagement with a filter head, said apparatus comprising:
    a jackscrew rotatably mounted on said canister and threaded for mating with a threaded portion of said filter head;
    means on said filter canister to substantially prevent longitudinal movement of said rotatable jackscrew relative to said canister;
    a notch in said filter head for receiving the first end of a lever and providing a fulcrum therefore; and
    a plurality of lugs fixed to and circumferentially spaced about the perimeter of said jackscrew such that at least one of said lugs is positioned to provide a point of lever resistance for the central portion of said lever whereby at least one of said plurality of lugs responds to the application of force to the second end of said lever by creating a mechanical advantage at said at least one of said plurality of lugs which, in turn, creates a torque on said jackscrew to selectively screw or unscrew said jackscrew relative to said filter head causing said filter canister to longitudinally move, without rotation, toward or away from respectively, said filter head.

2. An apparatus as set forth in claim 1 wherein the jackscrew is externally threaded and mates with an internal thread in the filter head.

3. An apparatus as set forth in claim 1, wherein said notch and said plurality of lugs are adapted, respectively, to receive and respond to a lever which is a screwdriver whose tip is received into said notch in said filter head and whose central shaft region is received by said at least one of said plurality of lugs.

4. A filter assembly for filtering a fluid passing therethrough, said assembly comprising:
    a filter head including a notch;
    a canister for receiving a filter element through an open end of said canister;
    a ring mounted proximate to said open end of said canister and being free to rotate about the periphery of said canister, said ring comprising first means for coupling between said filter head and said ring wherein said canister is caused to be operatively connected and sealed to said filter head without requiring rotation of said canister; and
    second means for tightening or loosening the coupling between said ring and said filter head wherein said second means may be operatively coupled with said filter head notch to form a second class lever whose fulcrum end is in said notch and whose point of resistance is located on said second means.

5. A filter assembly as set forth in claim 4 wherein said second means includes a plurality of lugs extending outwardly about the radial periphery of said ring and providing the point of resistance on said ring for said second class lever.

6. A filter assembly as set forth in claim 4, wherein said second class lever is movable between at least a first and second position so as to apply a torque to said ring, causing said ring to rotate.

7. A filter assembly as set forth in claim 6, wherein the torque applied to said ring increases from said first position to a maximum when said lever is positioned such that its longitudinal axis is parallel with the rotational axis of said ring.

* * * * *